Aug. 31, 1965    H. P. BRUEGGEMANN    3,203,328
FULL CIRCUMFERENTIAL VIEWING SYSTEM
Filed Feb. 21, 1963    2 Sheets-Sheet 1

HARRY P. BRUEGGEMANN
INVENTOR.

BY *R. E. Granger*
ATTORNEY

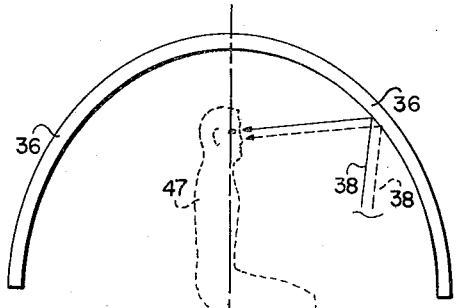
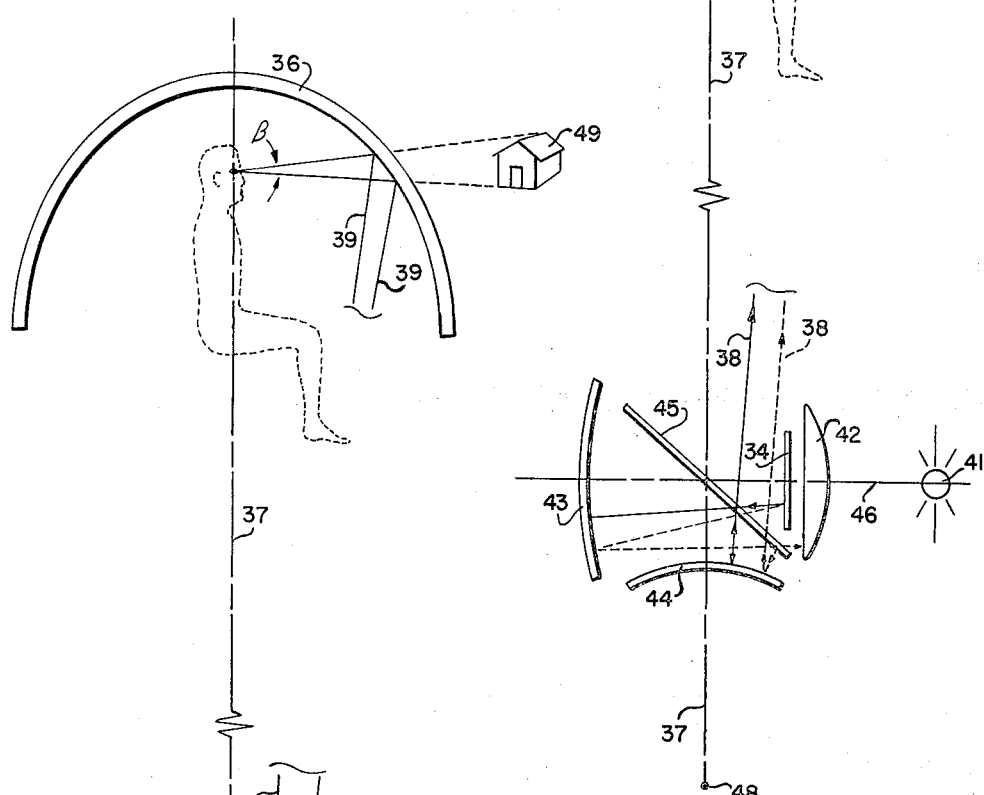
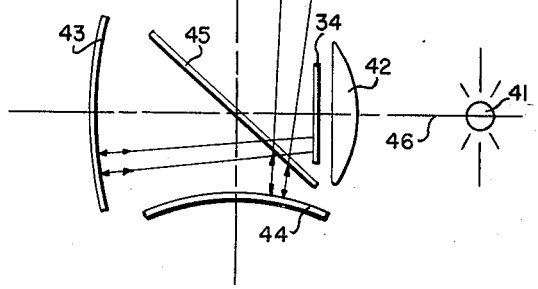
HARRY P. BRUEGGEMANN
INVENTOR.

United States Patent Office 3,203,328
Patented Aug. 31, 1965

3,203,328
FULL CIRCUMFERENTIAL VIEWING SYSTEM
Harry P. Brueggemann, San Marino, Calif., assignor to The Marquardt Corporation, Van Nuys, Calif., a corporation of California
Filed Feb. 21, 1963, Ser. No. 260,250
10 Claims. (Cl. 95—15)

This invention relates to methods and apparatus for displaying an image of a remote or photographed scene in a full 360° view to an observer placed at a particular location and more particularly to a full circumferential optical system comprising a convex hyperbolic mirror which gathers an image of the surrounding scene and an elliptical mirror, from the surface of which the image of the scene may be viewed.

Full circumferential viewing apparatus is used to reproduce for an observer a view of a remote or photographed panoramic scene as it would be seen by the observer if his head and body were turned about the vertical axis at which his eye was placed. In other words, the observer by turning his head through 360°, is able to see a complete panoramic projected image of a surrounding scene as it would be observed by the eye without an interposed optical system. A typical need for such apparatus arises in the construction of aero-space training equipment and simulators for reproducing the wide-angle field of view provided by vehicles such as aircraft, space capsules, and the like. A particular application of apparatus of this type is in connection with navigation training aids for helicopters wherein the pilot's view, along a particular flight path, is accurately simulated.

Apparatus of this general type has been proposed heretofore; however, certain inherent limitations have existed in prior devices, particularly with reference to their ability to record a panoramic view on film and subsequently reproduce the panoramic view from the film without significant distortion. To overcome the inherent limitations of prior devices of this general type, the present invention employs a spherical mirror in conjunction with the image-gathering convex hyperbolic mirror to direct an image from the object as a flat field onto the image-responsive element which may comprise photographic film or a television camera tube. The present invention also employs a spherical mirror in conjunction with an image-reproducing ellipsoidal mirror whereby the image from the film is reproduced as a view which is in sharp focus over its entire format. The hyperbolic curvature of the image-gathering mirror gives a 360° horizontal field of view and a vertical field of view approaching 180°. Distortion is removed, because the elliptical image-reproducing mirror, surrounding the observer, is a conjugate of the hyperbolic mirror's surface and has reciprocal eccentricity. In accordance with the present invention, caustic distortion in the hyperbolic mirror is eliminated, or is substantially reduced, by the interposed spherical mirror. An important feature of the present invention is the elimination of costly and low-resolution field flatteners of the type used in prior systems.

It is therefore a principal object of the invention to provide a panoramic viewing system having novel and improved optical elements for the reduction and elimination of image aberrations.

Another object of the invention is to provide a novel and improved panoramic viewing system which is compatabile with film recording and/or television pickup and image reproduction.

Another object of the invention is to provide a 360° circumferential viewing system of novel and improved construction.

Still another object of the invention is to provide a panoramic viewing system having novel and improved optical elements for the elimination of field flatness aberration over the entire format of the panoramic view.

Yet another object of the invention is to provide novel and improved apparatus which overcomes disadvantages of previous means and methods heretofore intended to accomplish generally similar purposes.

Other objects of the invention will in part be obvious and will in part appear hereinafter. The invention will be understood more completely from the following detailed description, taken in conjunction with the drawings, in which:

FIGURE 4 illustrates, in schematic form, the projector portion of the system and the manner in which light rays emanating from a point on the film are collimated to a parallel bundle of rays at the viewing station;

FIGURE 5 illustrates how the principal rays emanating from two different points on the flat film plane are directed towards the viewing station from two different directions.

Figure 1:
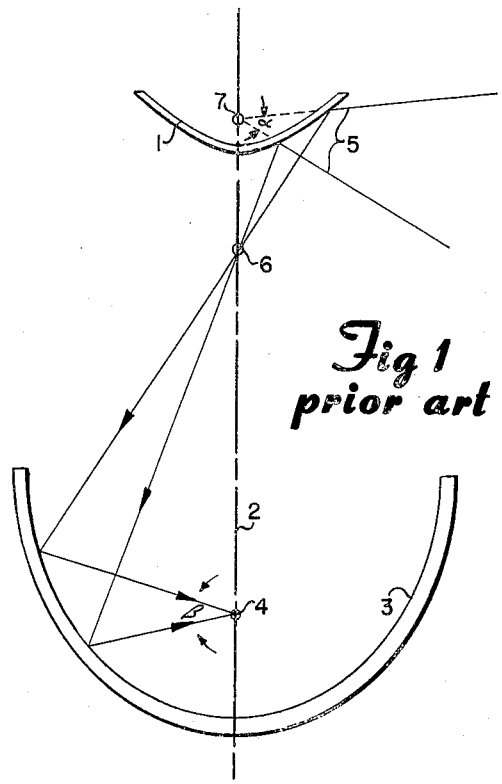
FIGURE 1 shows, in schematic form, a circumferential optical viewing system typical of prior apparatus.

Looking now at FIGURE 1 there is shown, in schematic form, the principal elements of a typical system of the prior art for obtaining a wide-angle panoramic view. A mirror 1 of hyperbolic surface of revolution, having a specular convex surface, is aligned on a common axis 2 with a second mirror 3 having an elliptical surface of revolution (prolate spheroid). The elliptical mirror 3 has a reflecting surface on the concave side, and is large enough to permit an observer's eye to be placed at the viewing station 4 at or near the focus of the ellipse (ellipse internal focus). Light rays 5 from a surrounding scene are reflected from the hyperbolic mirror 1 and pass through a focus point 6 at the common axis 2, then strike the elliptical mirror 3, and converge to the viewing station 4 where the observer's eye is located. The observer sees an image of the scene from which the light rays 5 are emanating as though his eye were viewing the actual scene from the point of internal focus 7 of the hyperbolic mirror 1. The two mirrors (1 and 3) receive and reflect light such that a converging ray striking the hyperbolic mirror 1 at a given angle $\alpha$, to the common axis 2 makes the same angle $\beta$ to the axis 2 after reflection from the elliptical mirror 3, but from the opposite direction. Angle $\alpha$ equals angle $\beta$. The elliptical mirror 3 has an eccentricity which is the reciprocal of that of the hyperbolic mirror 1.

It has been proposed, heretofore, to place a lens at the focus point 6 for increasing the light gathering capacity of the above-described optical system. However, such attempts have failed to produce images of the desired brightness at the elliptical mirror viewing station 4. Therefore, it was subsequently attempted to separate the system into two sub-systems one of which would permit photographing the viewed panoramic scene and the other of which would permit the subsequent projection of the photograph. By this technique it was hoped to utilize the very large light amplification inherent in the photographic process as implemented in a camera-film-projector system. In such a system, light from the surrounding scene is reflected by a hyperbolic mirror and is directed by a lens onto unexposed photographic film. After exposure, the photographic film is developed and made ready for projection. This constitutes a film recording or film preparation process and is achieved by the first subsystem. The projection of the image comprises an entirely separate operation which is achieved by the second subsystem comprising a lamp and projection lens for illuminating the film. The image on the film is projected via the projection lens and its associated optical system to the eliptical mirror and thence to the observer's eye at the ellipse focus. A camera-film-projector system of this type provides a great light-amplifying capability. That is, high-speed camera lens and film permit the scene to be photographed in a relatively dim light, while the projector can reproduce the recorded scene as a brightly lighted image. A limitation of prior systems of this type, however, has been that the actual image surface is rather strongly curved and in three dimensions. The photographic film, on the other hand, is in a two dimensional plane. That is, while the film is in the form of a flat plane, the actual image surface comprises a curved surface. The result is that the image received by the film is not in sharp focus over its entire field or format. Various classical techniques such as stopping down the lens to increase the depth of focus, have been attempted to overcome this limitation. However, these techniques are self defeating since they reduce the optical speed of the system and due to Rayleigh's limit there is a loss of resolution.

Certain constructions of the prior art have been able to provide sufficient light at the viewing station but an image of sufficient sharpness could not be maintained because of the above-mentioned fact that the photographic film is not precisely superimposed on the actual image surface.

There is provided by the present invention a novel and improved optical system which overcomes the above-discussed limitations of prior systems. Referring now to FIGURES 2–5, there is shown the principal elements comprising the present invention which overcomes the field flatness and caustic distortion of prior systems. The present invention provides means whereby the photographed image can be made to be directed as a flat field onto the flat plane of the film. By such means, the actual image surface can be made to fall precisely onto the photographic film plane, with no field flatness aberration over the entire format.

Figure 2:
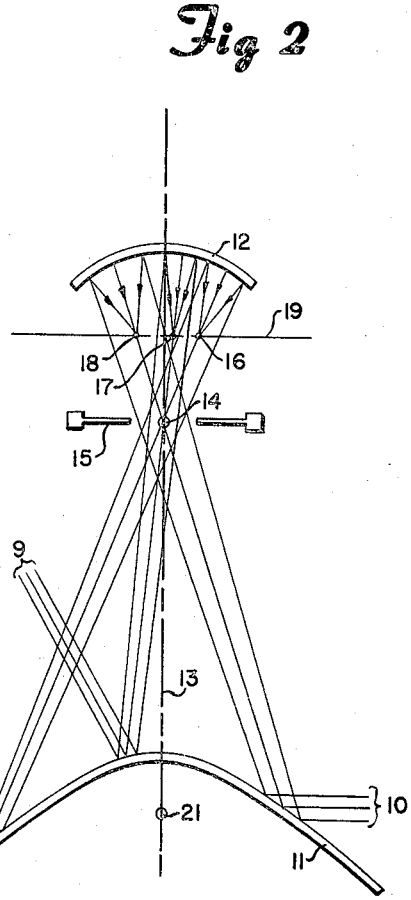
FIGURE 2 illustrates, in schematic form, the ray bundles and their relationship to certain of the optical elements of the present invention.

With particular reference to FIGURE 2, the operation of the apparatus may be understood by assuming three bundles of incoming parallel light rays 8–10, respectively, striking hyperbolic mirror 11 at different locations and being reflected upwards to an aligned spherical mirror 12. The center of curvature of the spherical mirror 12 lies on the axis 13 of the hyperbolic mirror 11 and approximately at its conjugate focus point 14. A suitable aperture stop 15 may be provided at this point (14) referred to hereinafter as the common focus. The center ray of each light ray bundle (8–10) passes through the common focus 14 and, therefore, upon striking the spherical mirror 12, is reflected back on a radial line toward the common focus 14. The other rays on each side of the center ray strike the spherical mirror 12 at a different angle, and upon reflection therefrom, intersect the reflected center ray at a particular point. For ray bundle 8 this point is 16, for bundle 9 this point is 17 and for bundle 10 this point is 18. It can be shown that all three of these points (16–18), as well as all other such points produced by similarly reflected light ray bundles, will fall within a common plane indicated edgewise by line 19. Actually, plane 19 is not absolutely (viz. mathematically) flat, as long as a truly spherical mirror is used. However, any deviation from optical flatness in plane 19 can be corrected by use of an aspherical mirror of suitable surface contour in lieu of a truly spherical mirror 12.

The geometrical arrangement of the system is such that the center of curvature of the spherical mirror 12 is located at or near the conjugate (external) focus of the hyperbolic mirror 11. As stated previously, this is the common focus 14 and is the location of the aperture stop 15. The internal focus of the hyperbola is indicated at 21. The radius of the spherical mirror 12 is approximately equal to the semi-latus rectum of the hyperbolic mirror 11.

While there will be some caustic distortion introduced by the two mirrors (11 and 12), the effect of this distortion in the hyperbolic mirror 11 will be effectively minimized, or cancelled, by the caustic distortion in the spherical mirror 12. Thus, it may be seen that by the use of a suitably positioned spherical mirror (or slightly aspherical), in accordance with the present invention, the full circumferential field of view may be directed as a flat plane field along plane 19. The structural configuration shown in FIGURE 2, while demonstrating the operation of the present invention, does not ideally lend itself to image reception by a planar photographic film or a planar sensitive surface of a television camera tube. That is, if it were not for the fact that the light rays directed to the spherical mirror 12 would be completely blocked, a flat photographic film could be placed in the plane 19 to record the image reflected from the spherical mirror 12. Since this is generally impractical, further means are provided to transpose the flat actual image surface in plane 19 to a displaced position having no interference with incoming light rays directed to the spherical mirror 12.

It should be understood that FIGURE 2 is schematically illustrated to facilitate teaching of the invention and is laterally exaggerated for clearly showing the overall effect.

Figure 3:
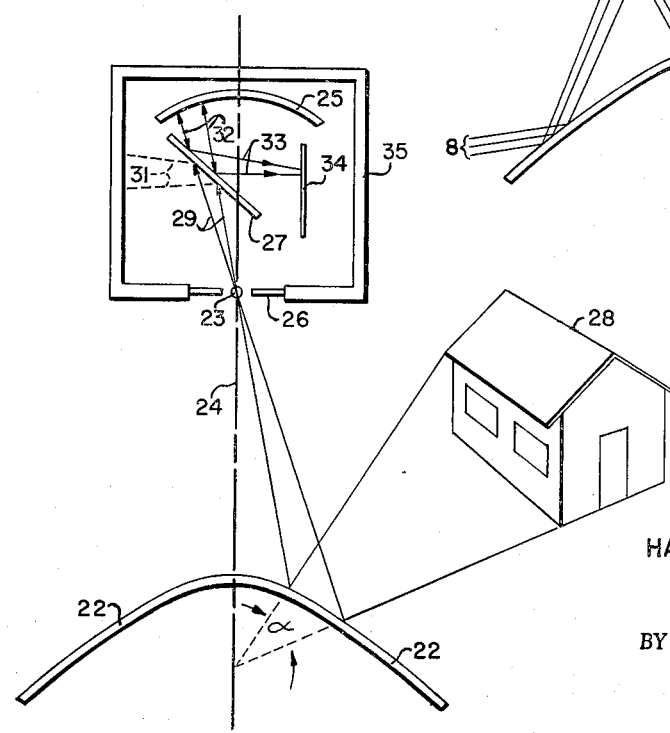
FIGURE 3 illustrates, in schematic form, the camera portion of the invention.

FIGURE 3 illustrates the apparatus of FIGURE 2 as embodied in a camera and which employs a suitable beam splitter, inserted at an appropriate location, to transpose the actual planar image surface onto a photographic film which is out of the path of light rays directed to the spherical mirror. The camera apparatus comprises a hyperbolic mirror 22, the convex surface of which is specular. The common focus 23 is located on common axis 24 of hyperbolic mirror 22 and spherical mirror 25. The aperture stop 26 is located in a plane passing through common focus 23. The beam splitter 27 may comprise a partially silvered mirror which will reflect a portion, and transmit a portion, of an incident light beam.

For clarity, parallel rays have been omitted from FIGURE 3 and only the principal rays (viz. those passing through the common focus 23) of two light ray bundles from different points of the object 28 are shown. As the light rays 29 strike the underside of the beam splitter 27, some of the light is reflected off to the left (as shown in dotted outline at 31) while the remaining light 32 passes upward through the beam splitter 27 striking the spherical mirror 25.

The light rays (32) are then reflected in the reverse direction and are returned to the upper surface of the beam splitter 27 through which they previously passed. As in the previous instance, upon striking the surface of the beam splitter 27 (the upper surface in this instance), the light ray is again divided, with a portion continuing through the surface downwardly toward the hyperbolic mirror 22, while the remaining portion 33 is reflected towards the right (as viewed in FIGURE 3) to impinge on the photographic film 34 for recording the actual image surface.

It should be understood that the camera assembly including the hyperbolic mirror 22, the spherical mirror 25, the aperture stop 26, the beam splitter 27 and the film 34 are enclosed in a suitable external housing. All but the first mentioned elements may be enclosed within an inner housing 35 having a light-tight and light-absorbing interior. Exact structural details of the external and internal housing and supporting structure are omitted since the configuration of such structural elements will be obvious to those versed in the art and it is deemed that the present disclosure is sufficient to permit those versed in the art to practice the invention. By providing the interior of the inner housing 35 with a black non-reflecting surface, extraneous light, such as may be reflected from the underside of the beam splitter 27, (e.g., rays 31) will be prevented from interfering with the light directed to the film 34 (e.g., rays 33).

After the exposed film 34 is processed it is then placed in a projector viewing system as shown in FIGURES 4 and 5. For purposes of clarity and to facilitate describing the structure and functioning of the projection system, the lower portion of FIGURES 4 and 5 are greatly enlarged relative to the upper portion comprising the elliptical mirror 36. Furthermore, the relative spacing between the upper and lower portions has been greatly foreshortened as indicated by the broken common axis 37 and broken light rays 38–39.

The projection apparatus comprises an elliptical mirror 36 the base diametral dimension of which may, for example, be of the order of four to six feet, a light source 41, a condenser lens 42, a first spherical mirror 43, a second spherical mirror 44, and a beam splitter 45. The concave side of mirror 36 has a specular surface; the concave side of mirror 43 has a specular surface; and, the convex side of mirror 44 has a specular surface. Beam splitter 45 is centered at the intersection of axis 37 and axis 46, and is inclined from the plane of film 34 at, for example, 45°. As in the case of the camera apparatus described hereinabove, supporting structure, housings, etc., have been omitted in the interests of clarity. FIGURE 4 shows how the light rays emanating from a point on the film 34 are collimated to a parallel bundle of rays at the observer's (47) viewing station. FIGURE 5 illustrates the manner in which the principal rays emanating from two different points on the flat film plane 34 are directed towards the viewing station from the two different directions.

Light from the light source 41 and condenser lens 42 projects the image on the film 34 towards the left along axis 46 (as viewed in FIGURES 4 and 5) onto the beam splitter 45. A portion of the light is reflected upwardly from the beam splitter 45, while the desired portion of the light passes on through the beam splitter 45 and impinges upon first spherical mirror 43. Light rays striking first spherical mirror 43 are reflected back to the beam splitter 45 where a portion of the light is transmitted back to the film plane (34) while the remaining light is reflected downwardly to second spherical mirror 44. Light rays striking second spherical mirror 44 are reflected in a reverse direction along an upwardly directed path and again strike the beam splitter 45 from which they were reflected. The desired light rays, reflected from second spherical mirror 44, pass through the beam splitter 45 and onto the elliptical mirror 36 for reflection to the observer's (47) eye at the viewing station. The angle $\beta$ between the principal ray 39 at the observer's (47) eye (see FIGURE 5) is the same as the angle $\alpha$ between the original incoming principal rays 29 which formed the image on the film 34 (see FIGURE 3). While one focus point of the elliptical mirror 36 is at the observer's (47) eye, the other focus point, or conjugate focus is indicated at 48 on the lower extreme on the common axis 37. Second spherical mirror 44 has its center of curvature at this point (48). First spherical mirror 43 has its center of curvature at an analogous point but with the central axis 37 rotated 90° as the horizontal axis 46. This arrangement will cause the caustic distortion introduced by the elliptical mirror 36 to be minimized or cancelled by the caustic distortion of the two spherical mirrors 43 and 44. Thus, in the manner first described in connection with FIGURE 2, there is provided by the present invention a distortion-free, aberration-free image 49 as seen by the observer 47, as it would appear at a great distance by actual sight.

In the embodiment of the camera apparatus and the projection apparatus discussed hereinabove in connection with FIGURES 3, 4 and 5, a specific combination of mirrors has been shown and described. However, it should be understood that virtually an infinite number of mirror combinations is possible. The particular embodiment shown and described has been selected as being typical in order to explain the fundamental operation of the invention. However, since other configurations, relative sizes, and other conic eccentricities may be employed as well as conic mirrors of varying dimensions, it is intended that all matter contained in the above description or shown in the accompanying drawings shall be interpreted as illustrative and not in a limiting sense. In this connection it should be understood that optical flats may be interposed in the axes of the systems shown, inclined at various angles, for the purpose of folding the light path or paths in order to adapt the apparatus to be contained in various desired housing configurations and eliminate interferences. Such expedients are well known to those versed in the art. Since it is to be understood that various omissions and substantial changes in the form and details of the devices illustrated and in their operation may be made by those skilled in the art, without departing from the spirit of the invention, it is intended that the invention be limited only as indicated by the scope of the following claims.

What is claimed is:

1. A full circumferential viewing system for producing an image of a 360° field of view comprising:
   a hyperbolic mirror having a convex specular surface located at a position such as to permit rays from a surrounding scene to fall thereon;
   a substantially spherical mirror having its center of curvature substantially coincident with the conjugate focus of said hyperbolic mirror, the concave side of said spherical mirror being specular whereby said image of said scene comprises a real image which will be formed in a substantially flat field plane.

2. A viewing system as defined in claim 1 including aperture stop means located at said conjugate focus.

3. A viewing system as defined in claim 2 including:
   beam splitter means interposed between said aperture stop means and said spherical mirror for diverting said image to a plane laterally displaced from the axis of said spherical mirror.

4. A viewing system as defined in claim 3 including:
   planar light sensitive means disposed at said laterally displaced plane.

5. A viewing system as defined in claim 4 wherein said light sensitive means comprises a photographic film.

6. Camera apparatus for photographing a 360° view angle in the horizontal plane and an elevation angle extending from approximately 30° below the horizon to the zenith comprising:
   a hyperbolic mirror having a convex specular surface located at a position such as to permit rays from a surrounding scene to fall thereon;
   a spherical mirror having its center of curvature on the axis of said hyperbolic mirror;
   beam splitter means for transmitting a portion of the light rays impinging thereon and for reflecting the remaining portion of said light rays, said beam splitter being disposed along said axis and inclined substantially 45° thereto; and
   a flat film disposed at a position to receive said remaining portion of said light rays reflected from said beam splitter means.

7. Camera apparatus as defined in claim 6 including:
   aperture stop means located at a point intermediate said hyperbolic mirror and said spherical mirror.

8. A viewing system as defined in claim 1 wherein the radius of curvature of said spherical mirror is approximately equal to the semi-latus rectum of said hyperbolic mirror.

9. A viewing system as defined in claim 1 including:
   means for redirecting the optic axis and the image plane of said system to a position external to the optical path between said hyperbolic mirror and said spherical mirror.

10. Camera apparatus for covering a 360° view angle in the horizontal plane and an elevation angle extending from a point below the horizon to the zenith, comprising:
- a hyperbolic mirror having a convex specular surface located at a position such as to permit rays from a surrounding scene to fall thereon;
- a spherical mirror having its center of curvature on the axis of said hyperbolic mirror;
- beam splitter means for transmitting a portion of the light rays impinging thereon and for reflecting the remaining portion of said light rays, said beam splitter means being disposed along said axis and inclined thereto; and
- a substantially planar light sensitive means disposed at a position to receive said remaining portion of said light rays reflected from said beam splitter means.

References Cited by the Examiner
UNITED STATES PATENTS

| | | | |
|---|---|---|---|
| 2,299,682 | 10/42 | Conant | 88—24 |
| 2,430,595 | 11/47 | Young | 88—57 |
| 2,972,281 | 2/61 | Dresser | 88—16.8 |

NORTON ANSHER, *Primary Examiner.*

JOHN M. HORAN, *Examiner.*